United States Patent [19]

Kalian et al.

[11] Patent Number: 5,409,289
[45] Date of Patent: Apr. 25, 1995

[54] CROSS MEMBER ASSEMBLY FOR A VEHICLE FRAME

[75] Inventors: Arianna Kalian, Farmington Hills; Robert E. Stewart, Westland, both of Mich.

[73] Assignee: General Motors Corporation, Detroit, Mich.

[21] Appl. No.: 191,904

[22] Filed: Feb. 4, 1994

[51] Int. Cl.⁶ .................... B62D 25/08; F16B 37/00
[52] U.S. Cl. ............................ 296/204; 296/194; 411/104
[58] Field of Search ............... 296/187, 193, 194, 203, 296/204, 29; 411/84, 85, 104

[56] References Cited

U.S. PATENT DOCUMENTS

| | | | |
|---|---|---|---|
| 2,381,233 | 8/1945 | Summers | 24/221 |
| 3,131,963 | 5/1964 | Schilberg | 296/204 |
| 4,021,129 | 5/1977 | Sykes | 411/84 X |
| 4,406,343 | 9/1983 | Harasaki | 296/194 X |
| 4,753,315 | 6/1988 | Fujisaki et al. | 296/194 X |
| 4,790,701 | 12/1988 | Baubles | 411/85 |
| 4,822,096 | 4/1989 | Fujii | 296/194 |
| 4,875,816 | 10/1989 | Peterson | 411/104 |
| 4,895,484 | 1/1990 | Wilcox | 411/85 |
| 4,934,886 | 6/1990 | Aikens | 411/85 |
| 5,022,804 | 6/1991 | Peterson | 411/104 |
| 5,098,765 | 3/1992 | Bien | 411/104 X |
| 5,127,704 | 7/1992 | Komatso | 296/194 X |
| 5,193,643 | 3/1993 | McIntyre | 180/312 |

*Primary Examiner*—Dean J. Kramer
*Attorney, Agent, or Firm*—William A. Schuetz

[57] ABSTRACT

A cross member assembly that forms a structural part of a vehicle frame for supporting vehicle components and which consists of an elongated box-like cross bar adapted to have a nut retainer inserted within the crossbar and includes detent members for maintaining the nut retainer in a fixed position relative to the cross bar while at the same time serving to position the nuts on the nut retainer in alignment with bolt openings formed in the cross bar.

3 Claims, 2 Drawing Sheets

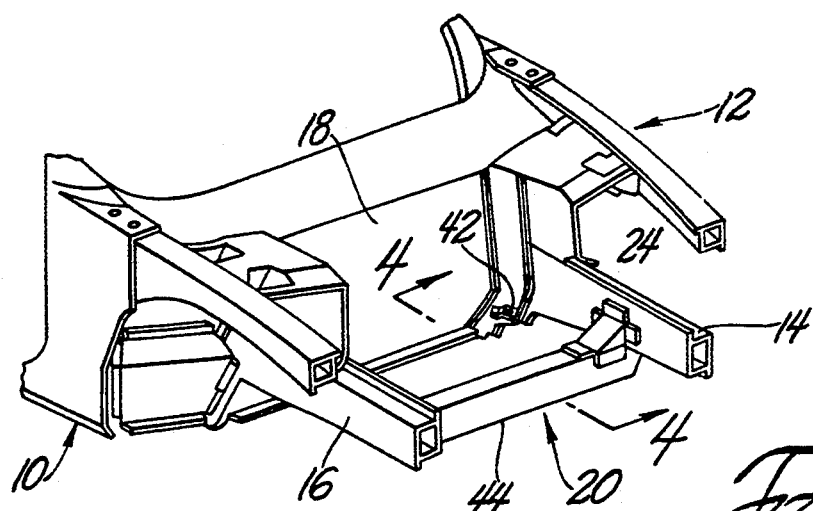

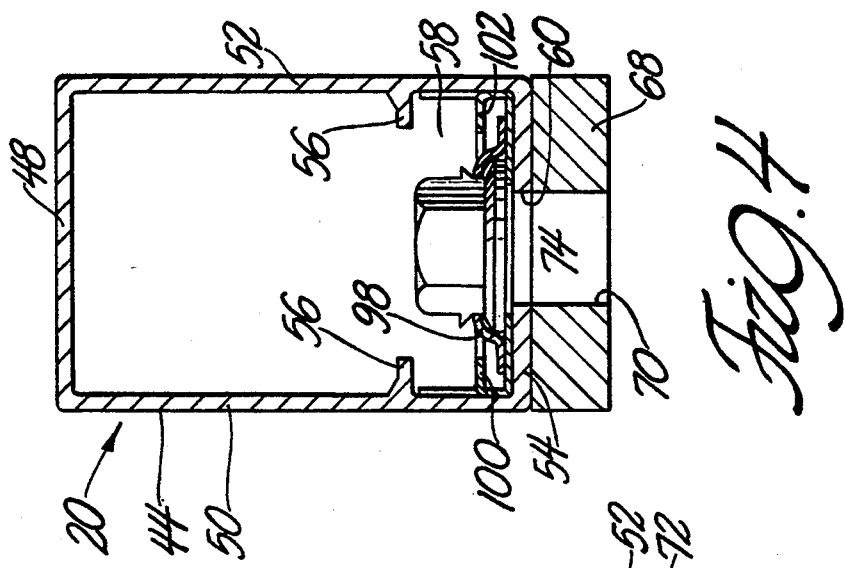
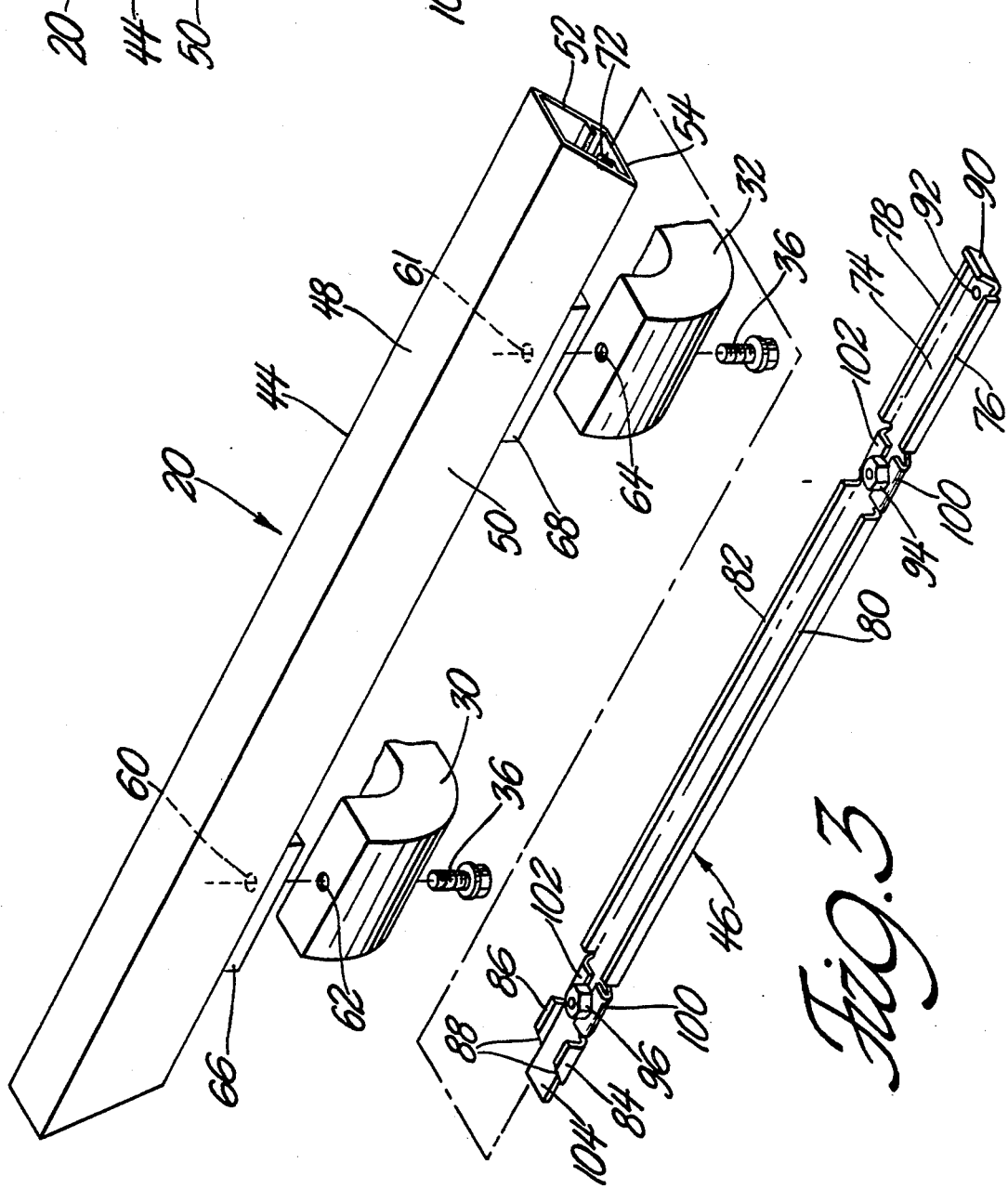

CROSS MEMBER ASSEMBLY FOR A VEHICLE FRAME

This invention concerns vehicle frames and more particularly relates to a cross member assembly that includes a cross bar combined with a nut retainer which together serve as a fixed support for one end of a cradle having a vehicle component connected thereto.

BACKGROUND OF THE INVENTION

Most vehicles presently manufactured by the auto industry utilize the so-called unibody construction in which the front end of the vehicle body, beginning at the firewall, is provided with a stub frame. This type of vehicle body design eliminates the need for a separate frame member and lends itself well for use with front wheel drive powertrains. In this type of body design, it is common to provide the stub frame with a pair of lower rails fixed at their rear ends to the vehicle body and having one or more cross members which can serve to support a cradle having suspension and powertrain components connected thereto.

SUMMARY OF THE INVENTION

The present invention relates to a stub frame of the type described above in which the side rails of the stub frame are joined together by a novel cross member assembly which includes a nut retainer and a cross bar designed so they can be combined to form a unitary support structure and which has means that allow the nuts on the nut retainer to be accurately aligned with bolt openings provided in the cross bar. More specifically, the present invention is incorporated in a vehicle provided with a unitized body, the front end of which includes a stub frame fixed with a passenger compartment portion of the body and supporting a cradle adapted to support a power source and/or suspension components. The stub frame includes a pair of laterally spaced lower rail members, one end of each of which is connected to the passenger compartment portion of the body and extends therefrom along an axis substantially parallel to the longitudinal center axis of the vehicle. The cradle has a pair of forwardly extending support arms and includes mounting sections at the rear thereof for connection to the body. A cross member assembly, according to the present invention, is fixed at its opposed ends to the rails for supporting the support arms of the cradle and comprises a hollow cross bar having a nut retainer mounted therein. In the preferred form, the cross bar is an extruded member generally rectangular in cross section and includes a top wall, a pair of side walls, and a bottom wall. The bottom wall has a pair of openings formed therein which are adapted to have a pair of bolts inserted therethrough for connecting the support arms of the cradle to the cross member assembly. In addition, each of the side walls has the inner surface thereof formed with an inwardly extending tongue. The nut retainer, located within the cross bar, is provided with a pair of nuts, the threaded openings of which are aligned with the pair of openings in the bottom wall for receiving the pair of bolts. The nut retainer comprises an elongated base seated on the bottom wall of the cross bar and is integrally formed with a pair of laterally spaced upstanding guide walls. The arrangement of the nut retainer within the crossbar is such that one of the guide walls is located adjacent one of the side walls of the cross bar while the other of the guide walls is located adjacent the other of the side walls. Also, each of the guide walls has the free end thereof located adjacent the tongue formed with the associated side wall so the tongue can serve as a stop to prevent upward movement of the nut retainer when the bolts are threaded into nuts. Detent means are also formed with the bottom wall of the cross bar and the base of the nut retainer so when the latter is inserted into the crossbar, each of the nuts will register with one of the openings in the bottom wall of the cross bar to allow the bolts to pass through the openings and be threaded into the aligned nut on the nut retainer.

The objects of the present invention are to provide a new and improved cross member assembly that forms pan of a vehicle frame and includes a hollow cross bar provided with a nut retainer having nuts attached thereto at spaced intervals that are accurately located through detent means relative to bolt openings formed in the cross bar; to provide a new and improved cross member assembly adapted to have vehicle suspension and/or powertrain components connected thereto and which includes an extruded cross bar provided with a channel portion adapted to receive a nut retainer and maintain the latter in a fixed position when bolts are inserted through bolt openings in the cross bar for threaded engagement with the nuts mounted on the nut retainer; and to provide a new and improved cross member assembly that forms a structural part of a vehicle stub frame for supporting vehicle components and which has an elongated box-like cross bar adapted to have a nut retainer inserted within the crossbar and includes detent means for maintaining the nut retainer in a fixed position relative to the cross bar while at the same time serving to position the nuts on the nut retainer in alignment with bolt openings formed in the cross bar.

Other objects and advantages of the present invention will be more apparent from the following derailed description when taken with the drawings in which:

BRIEF DESCRIPTION OF THE DRAWINGS

FIG. 1 is a fragmentary perspective view of the front end of a vehicle body of the unibody type and shows the stub frame portion of the body incorporating a cross member assembly made in accordance with the present invention;

FIG. 2 is a fragmentary perspective view of the stub frame portion seen from a side opposite to that seen in FIG. 1 and shows a portion of a cradle that is adapted to be connected to and supported in part by the cross member assembly made in accordance with the present invention;

FIG. 3 is an enlarged exploded view showing the details of the cross bar and nut retainer which together form the cross member assembly seen in FIGS. 1 and 2 for supporting the forward arms of the cradle;

FIG. 4 is an enlarged cross sectional view taken on line 4—4 of FIG. 1; and

FIG. 5 is an enlarged view of one end of the cross member assembly with pans broken away so as to show the detent means which serve to lock the nut retainer in position relative to the cross bar.

DETAILED DESCRIPTION OF THE PREFERRED EMBODIMENT

Referring now to the drawings and more particularly to FIGS. 1 and 2 thereof, the front frame portion of a vehicle body 10 of the unibody type is shown that is normally referred to, and will hereinafter be referred to, as a stub frame 12. In this instance, the stub frame 12 includes a pair of laterally spaced lower rail members 14 and 16 which are of a hollow box construction and have their rear ends fixedly secured to a reinforced front end of a passenger compartment portion (not shown) of the body that includes a firewall 18. The rail members 14 and 16 extend forwardly from the firewall, and each rail member 14 and 16 is located along an axis which is substantially parallel to the longitudinal center axis of the vehicle body 10. A cross member assembly 20 made in accordance with the present invention has its opposed ends secured to the rail members 14 and 16 by a pair of identical triangularly-shaped mounting brackets 22 and 24. As best seen in FIG. 2, the cross member assembly 20 is a structural pan of the stub frame 12 and provides a mounting surface to which the front end of a cradle 26 can be fastened.

In this regard and with further reference to FIG. 2, it will be noted that only one half of the cradle 26 is shown and that the other half is a mirror image of the portion shown in FIG. 2 and is connected thereto by a beam 28. Thus, it should be understood that the cradle 26 has two forwardly extending arms 30 and 32, as seen in FIG. 3, and has two side extending arms such as the arm identified by the reference numeral 34 seen in FIG. 2. Each of the arms 30 and 32 is adapted to be secured to the cross member assembly 20 by a bolt 36 as seen in FIG. 3, while the side arms 34 are adapted to be secured by similar bolt means 38 to a pair of identical reinforcing mounting plates 40 and 42 located at the inside corners of the stub frame 12. Although not shown, the cradle 26 can serve to support various components of the motor vehicle such as pans of the vehicle suspension system, steering system, and powertrain.

The cross member assembly 20 consists of a hollow elongated cross bar 44 adapted to receive and support a nut retainer 46 and together with the latter forms a unitary structural pan of the stub frame 12 to which the cradle 26 or the like can be connected. More specifically and as best seen in FIGS. 3 and 4, it is intended that the cross bar 44 be an extruded member made from a light weight material such as aluminum. As seen in FIG. 3, the cross bar 44 is rectangular in cross section and includes a top wall 48, a pair of laterally spaced and parallel side walls 50 and 52, and a bottom wall 54 which lies in a plane substantially parallel to the plane of the top wall 48. The inner surface of each of the side walls 50 and 52 is formed with an inwardly projecting tongue 56. Each tongue 56 is located in a common horizontal plane which is substantially parallel to the top wall 48 and bottom wall 54 and extends the full length of the associated side wall. The opposed tongues 56 begin and end at the opposed angled ends of the cross bar 44, as seen in FIG. 5, so as to form a guide channel 58 within the cross bar 44 that includes the bottom wall 54 and the lower portions of side walls 50 and 52. In addition, the bottom wall 54 is provided with a pair of circular bolt openings 60 and 61, the centers of which are spaced a distance corresponding to the spacing between the centers of the bolt openings 62 and 64 in the forward arms 30 and 32 of the cradle 26. As seen in FIGS. 4 and 5, a pair of identical reinforcing plates 66 and 68 are secured to the bottom wall 54 in the area of the bolt openings 60 and 61 thereof and, in each instance, each of the reinforcing plates 66 and 68 is provided with a circular opening 70 which registers with the associated bolt opening 60 or 61 formed in the bottom wall 54. The bottom wall 54 is also formed with a circular opening 72 located adjacent the right hand angled end of the cross bar 44, as seen in FIG. 3, and midway between the side walls 50 and 52.

As seen in FIGS. 3 and 4, the nut retainer 46 comprises an elongated base 74 made of aluminum and integrally formed with laterally spaced upstanding guide walls 76, 78, 80, 82, 84 and 86 provided along the length of the base 74. All of the guide walls 76–86 are of uniform height and, except for the guide walls 84 and 86, have the opposed ends thereof located in vertical planes extending transversely to the longitudinal axis of the base 74. Each of the guide walls 84 and 86 located at the left hand end of the base 74, as seen in FIG. 3, terminate short of the end of the base 74 and have their ends 88 located in a transverse plane inclined at an angle of approximately 30 degrees for reasons to be explained hereinafter. The opposite end of the base 74 adjacent walls 76 and 78 is integrally formed with a tab 90 which is inclined at an angle which corresponds to the angled end of the cross bar 44 as seen in FIG. 5. A dimple 92 which protrudes from the lower surface of the base 74 is located adjacent the tab 90 midway between the guide walls 76 and 78.

The base 74 of the nut retainer 46 serves to support a pair of identical hex flange nuts 94 and 96, each of which is staked onto a steel support plate 98 which, in turn, is caged on the base 74 by a pair of opposed flap portions 100 and 102 which are integral with the base 74 and crimped over the support plate 98. Thus, each of the nuts 94 and 96 is retained in position on the base 74 with a limited amount of float in a direction extending transversely to and/or longitudinally of the base 74. At the same time, the nuts 94 and 96 are prevented from rotating. It will be noted that the distance between the centers of the threaded openings of the nuts 94 and 96 on the nut retainer 46 is essentially the same as the distance between the centers of the bolt openings 60 and 61 in the cross bar 44. Also, the distance from the center of the dimple 92 in the base 74 to the center of the adjacent nut 94 is essentially the same as the distance from the center of the opening 72 in the bottom wall 54 of the cross bar 44 to the center of the adjacent bolt opening 61.

As alluded to hereinbefore, the nut retainer 46 is adapted to be combined with the cross bar 44 to form the cross member assembly 20. In this regard and as seen in FIG. 4, it will be noted that the vertical height of the guide walls 76–86 of the nut retainer 46 is substantially the same as the vertical height between the bottom wall 54 and the tongue 56 of the cross bar 44 with some clearance being provided between the parts to allow assembly thereof. Accordingly, during assembly of the nut retainer 46 with the cross bar 44 as seen in FIG. 3, the left hand end of the nut retainer 46 is initially placed into the guide channel 58 at the right hand end of the cross bar 44. More specifically, a flat guide tab 104, located at the insert end of the base 74 and which is an extension of the base 74, is placed on the bottom wall 54 of the guide channel 58 of the cross bar 44. Afterwards, the nut retainer 46 is pushed towards the left hand end of the cross bar 44 during which time entry into the guide channel 58 is facilitated by the inclined end 88 of each of the walls 84 and 86. When the nut retainer 46 is almost fully inserted into the guide channel 58 of the cross bar 44, the dimple 92 will contact the outer edge of the bottom wall 54. At this point of the insertion, an increased amount of force will be required to cause the dimple 92 to clear the edge of the bottom wall 54 and, thereafter, snap into the opening 72 formed in the bottom wall 54 as seen in FIG. 5. When the dimple 92 snaps into the opening 72, the nut retainer 46 will be locked to the cross bar 44. At the same time, the inclined tab 90 will contact the end portions of the tongues 56 adjacent the right hand end of the cross bar 44, as seen in FIG. 5, and the nuts 94 and 96 on the nut retainer 46 will be aligned with the bolt openings 60 and 61 in the cross bar 44. Afterwards, the forward arms 30 and 32 of the cradle 26 can be secured to the cross member assembly 20, as seen in FIG. 2, by simply inserting the bolts 36 through the bolt openings 62 and 64 in the arms 30 and 32, into the bolt openings 60 and 61 in the cross bar 44 and into the threaded openings of the nuts 94 and 96. In this regard, it will be noted that inasmuch as the guide walls 76–86 of the nut retainer 46 are sized so as to fill (with some clearance as mentioned hereinbefore) the space between the bottom wall 54 and the tongues 56 formed on the side walls 50 and 52, the guide walls 76–86 contact the tongues 56, and the latter serve as stop members resisting upward movement of the nut retainer 46 and the nuts 94 and 96 thereon when upward pressure on the latter nuts is applied during insertion of the bolts 36. Accordingly, it should be apparent that the assembly of the cradle 26 to the stub frame 12 is facilitated by use of the cross member assembly 20.

Various changes and modifications can be made in the above described cross member assembly without departing from the spirit of the invention. Such changes and modifications are contemplated by the inventors, and they do not wish to be limited except by the scope of the appended claims.

The embodiments of the invention in which an exclusive property or privilege is claimed are defined as follows:

1. In a vehicle provided with a body the front end of which includes a stub frame fixed with the passenger compartment portion of the body and supporting a cradle adapted to support drive components of said vehicle, said cradle having a pair of forwardly extending arms, said stub frame having a pair of laterally spaced rail members one end of each of which is connected to said passenger compartment portion of said body and extends therefrom along an axis substantially parallel to the longitudinal center axis of said vehicle, a cross member assembly fixed to said pair of rail members for supporting said pair of arms of said cradle and comprising a hollow cross bar and a nut retainer, said cross bar having a guide channel formed therein which slidably receives said nut retainer, said cross bar being generally rectangular in cross section and including a top wall, a pair of side walls and a bottom wall, said bottom wall having a pair of openings adapted to have a pair of bolts inserted therein for connecting said pair of arms of said cradle to said cross bar, each of said side walls having the inner surface thereof formed with an inwardly projecting tongue which together with said side walls and said bottom wall define said guide channel, said nut retainer being provided with a pair of nuts the threaded openings of which register with said pair of openings in said bottom wall for receiving said pair of bolts, said nut retainer comprising an elongated base seated on said bottom wall of said cross bar, said base being integrally formed with a pair of laterally spaced upstanding guide walls, one of said pair of guide walls being located adjacent one of said pair of side walls of said cross bar and the other of said pair of guide walls being located adjacent the other of said pair of side walls, each of said guide walls having the free end thereof located adjacent said tongue formed with the associated side wall whereby said tongue serves as a stop to prevent upward movement of said nut retainer when said pair of bolts is threaded into said pair of nuts for connecting said arms of said cradle to said cross bar, and detent means formed with said bottom wall of said cross bar and with the base of said nut retainer so when the latter is inserted into said crossbar, each of said pair of nuts of the nut retainer will be located in proper alignment with said pair of openings in said bottom wall of said cross bar to allow said pair of bolts to pass through said openings and be threadably connected to said pair of nuts.

2. In a vehicle provided with a body the front end of which includes a stub frame fixed with the passenger compartment portion of the body and supporting a cradle adapted to support drive components of said vehicle, said cradle having a pair of forwardly extending arms, said stub frame having a pair of laterally spaced rail members one end of each of which is connected to said passenger compartment portion of said body and extends therefrom along an axis substantially parallel to the longitudinal center axis of said vehicle, a cross member assembly fixed to said pair of rail members for supporting said pair of arms of said cradle and comprising a hollow cross bar and a nut retainer, said cross bar having a guide channel formed therein which slidably receives said nut retainer, said cross bar being generally rectangular in cross section and including a top wall, a pair of side walls and a bottom wall, said bottom wall having a pair of openings adapted to have a pair of bolts inserted therein for connecting said pair of arms of said cradle to said cross bar, each of said pair of side walls having the inner surface thereof formed with an inwardly projecting tongue which extends the full length of the associated side wall and together with said side walls and said bottom wall define said guide channel, said nut retainer being provided with a pair of nuts the threaded openings of which register with said pair of openings in said bottom wall for receiving said pair of bolts, said nut retainer comprising an elongated base seated on said bottom wall of said cross bar and having said pair of nuts mounted thereon, said base having an insert end formed with a guide tab and being integrally formed with a pair of laterally spaced upstanding guide walls extending substantially the full length of said base, one of said pair of guide walls being located adjacent one of said pair of side walls of said cross bar and the other of said pair of guide walls being located adjacent the other of said pair of side walls, each of said guide walls having the upper free end thereof located adjacent said tongue formed with the associated side wall whereby said tongue serves as a stop to prevent upward movement of said nut retainer when said pair of bolts is threaded into said pair of nuts for connecting said arms of said cradle to said cross bar, and detent means formed with said bottom wall of said cross bar and with the base of said nut retainer so when the latter is inserted into said crossbar, each of said pair of nuts of the nut retainer will be located in proper alignment with said pair of openings in said bottom wall of said cross bar to allow said pair of bolts to pass through said openings and be threadably connected to said pair of nuts.

3. In a vehicle provided with a body the front end of which includes a stub frame fixed with the passenger compartment portion of the body and supporting a cradle adapted to support drive components of said vehicle, said cradle having a pair of forwardly extending arms, said stub frame having a pair of laterally spaced rail members one end of each of which is connected to said passenger compartment portion of said body and extends therefrom along an axis substantially parallel to the longitudinal center axis of said vehicle, a cross member assembly fixed to said pair of rail members forwardly of said passenger compartment portion for supporting said pair of arms of said cradle, said cross member assembly comprising a hollow cross bar and a nut retainer, said cross bar having a guide channel formed therein which slidably receives said nut retainer, said cross bar being an extruded member generally rectangular in cross section and including a top wall, a pair of side walls and a bottom wall, said bottom wall having a pair of bolt openings the centers of which are spaced a predetermined distance from each other, said pair of bolt openings adapted to have a pair of bolts inserted therein for connecting said pair of arms of said cradle to said cross bar, each of said pair of side walls having the inner surface thereof formed with an inwardly projecting tongue which extends the full length of the associated side wall and together with said side walls and said bottom wall define said guide channel, said nut retainer being provided with a pair of nuts the threaded openings of which are spaced from each other a distance substantially equal to said predetermined distance so as to cause said threaded openings to register with said pair of openings in said bottom wall for receiving said pair of bolts, said nut retainer comprising an elongated base seated on said bottom wall of said cross bar and having said pair of nuts mounted thereon, said base having an insert end formed with a guide tab and being integrally formed with a pair of laterally spaced upstanding guide walls extending substantially the full length of said base, one of said pair of guide walls being located adjacent one of said pair of side walls of said cross bar and the other of said pair of guide walls being located adjacent the other of said pair of side walls, each of said guide walls having the upper free end thereof located adjacent said tongue formed with the associated side wall whereby said tongue serves as a stop to prevent upward movement of said nut retainer when said pair of bolts is threaded into said pair of nuts for connecting said arms of said cradle to said cross bar, said guide walls located adjacent said insert end of said base being formed with an inclined leading edge for facilitating insertion of said nut retainer into said guide channel of said cross bar, and detent means formed with said bottom wall of said cross bar and with the base of said nut retainer so when the latter is inserted into said crossbar, said detent means will cause said pair of nuts of the nut retainer to be located in proper alignment with said pair of openings in said bottom wall of said cross bar to allow said pair of bolts to pass through said openings and be threadably connected to said pair of nuts, said detent means comprising a dimple formed in the base of said nut retainer, and said bottom wall having an opening formed therein for allowing said dimple to snap into said opening when said nut retainer is fully inserted into said cross bar.

* * * * *